US009164519B2

(12) United States Patent
Holloway

(10) Patent No.: US 9,164,519 B2
(45) Date of Patent: Oct. 20, 2015

(54) SMART ENVIRONMENTAL CONTROL SYSTEM FOR AN ENCLOSURE WITH DIAGNOSTICS

(75) Inventor: David Carr Holloway, Baldwinsville, NY (US)

(73) Assignee: Cooper Technologies Company, Houston, TX (US)

( * ) Notice: Subject to any disclaimer, the term of this patent is extended or adjusted under 35 U.S.C. 154(b) by 1222 days.

(21) Appl. No.: 13/014,801

(22) Filed: Jan. 27, 2011

(65) Prior Publication Data
US 2011/0118896 A1 May 19, 2011

(30) Foreign Application Priority Data
Sep. 15, 2009 (WO) ................ PCT/US2009/056936

(51) Int. Cl.
G05D 23/19 (2006.01)
G05D 27/02 (2006.01)
G05B 19/042 (2006.01)
F24F 11/00 (2006.01)

(52) U.S. Cl.
CPC ............ *G05D 27/02* (2013.01); *F24F 11/0086* (2013.01); *G05B 19/0428* (2013.01); *F24F 11/0015* (2013.01); *F24F 2011/0032* (2013.01); *G05B 2219/23227* (2013.01); *G05B 2219/23317* (2013.01); *Y02B 30/78* (2013.01)

(58) Field of Classification Search
CPC ...................................................... G05D 23/19
USPC ................................... 700/300, 90
See application file for complete search history.

(56) References Cited

U.S. PATENT DOCUMENTS

| 4,361,273 | A | * | 11/1982 | Levine et al. ................... 236/11 |
| 4,449,764 | A | | 5/1984 | Hastings |
| 4,589,712 | A | | 5/1986 | Hastings |
| 2003/0049854 | A1 | * | 3/2003 | Rhodes .......................... 436/106 |
| 2004/0031335 | A1 | * | 2/2004 | Fromme et al. ................. 73/865 |

OTHER PUBLICATIONS

National Electrical Manufacturers Association, NEMA Enclosure Types, Nov. 2005, 9 pages, National Electrical Manufacturers Association, Rossyln, Virginia.

* cited by examiner

*Primary Examiner* — Tejal Gami
(74) *Attorney, Agent, or Firm* — King & Spalding LLP

(57) ABSTRACT

Environmental conditions within an enclosure containing critical equipment and devices are monitored and when outside of acceptable parameters corrective action is taken to modify these environmental conditions so as to bring them within acceptable limits. Unless an environmental condition is outside of an acceptable limit, no energy expenditure is made by the environmental conditioning equipment since it does not need to be in use. When the environmental conditioning equipment is called into operation, its environmental modification influence is monitored to determine if the expected environmental modification is occurring within an expected time period(s). If the expected environmental modification does not occur within the expected time period, and/or does not occur at an expected time rate of change, then an alarm is generated to indicate that maintenance may be required for the environmental conditioning equipment.

28 Claims, 6 Drawing Sheets

SMART ENVIRONMENTAL CONTROL SYSTEM FOR AN ENCLOSURE WITH DIAGNOSTICS

RELATED PATENT APPLICATION

This application claims priority to commonly owned International Application Number PCT/US2009/056936; filed Sep. 15, 2009; entitled "Integrated Condition or Actuation Monitoring and Control Component for Switches, Circuit Breakers, Panel Boards, and Other Items for Electrical Control and Circuit Protection," by David Carr Holloway, Kerop D. Janoyan and Matthew J. Whelan; and is hereby incorporated by reference herein for all purposes.

TECHNICAL FIELD

The present disclosure relates generally to monitoring and controlling environmental conditions inside of an enclosure, and more particularly, to monitoring and controlling relative humidity, moisture content, condensing water vapor accumulation and dangerous levels of explosive gas(es) in the enclosure, and when appropriate limits thereof are exceeded, alarming, disabling and/or removing electrical power from components located in the enclosure that may be affected thereby.

BACKGROUND

Operation of switches, protective devices (e.g., circuit breakers, fuses, electromechanical and solid state relays), contactors, motor overload circuits, and electronic monitoring and control devices (e.g., microcontrollers, data acquisition and control systems) (hereinafter "components") can be affected by changes in the surrounding environment in which these components are disposed. For example, if the components are disposed in an enclosure and the humidity of the components' surrounding environment increases beyond a certain threshold, the components may not operate as intended and/or an arc fault condition may occur. Typically, the conditions of the components' surrounding environment are usually apparent when a person opens the enclosure to observe its inside. However, these conditions are not noticed until the enclosure is opened and the components' surrounding environment can be observed. While the components operate to prevent potentially harmful situations, the failure to acknowledge and adjust the components' surrounding environment can lead to other hazardous consequences, such as harm to equipment and/or personnel. Many of these components can be expensive and/or critical to commercial/industrial plant operation and/or personnel safety. If the change in the components' surrounding environment is not properly monitored and controlled, then the expensive and/or critical components can become damaged and/or not operate as intended when the surrounding environment is outside of acceptable operating conditions. Expensive and/or critical equipment that the expensive and/or critical components protect also can become damaged. In addition, replacement of the environmentally damaged expensive and/or critical components can be expensive and time consuming.

SUMMARY

Therefore, a need exists for monitoring and controlling environmental conditions, e.g., relative humidity (RH), temperature, pressure, condensation, inside of an enclosure in which critical protective and operational components are disposed. If the surrounding environmental conditions inside of the enclosure do not meet acceptable operating conditions of the components, then some form of corrective action and/or notification occurs. If the required corrective action(s) does not occur or cannot correct the surrounding environment to an acceptable operating condition within a certain time period, then an alarm indication and/or a shutdown operation may be initiated.

Corrective actions to the environmental conditions within the enclosure may be obtained by, for example but not limited to: (1) increasing the air temperature within the enclosure with a space heater so as to prevent water vapor contained in the air (moisture laden air) within the enclosure from condensing into a liquid, (2) dehumidifying (conditioning) the air within the enclosure with a forced air dehumidification system so as to reduce the water vapor contained therein (reduce RH), and/or (3) purging the interior of the enclosure with a dry inert gas, e.g., dry nitrogen, so as to displace and/or dilute the moisture laden air contained therein. The space heater is preferably located within the enclosure. The dehumidification equipment and/or the dry inert gas purge systems may be located internal to or external from the enclosure, wherein the conditioned air and/or purge gas is coupled into the enclosure with appropriate tubing or ventilation ducts.

Corrective actions to the environmental conditions within the enclosure may not be necessary when certain favorable external environmental conditions are present. Therefore, less energy may be consumed when a corrective action is not required. Thus, only a minimal amount of energy will be used in maintaining satisfactory environmental conditions within the enclosure. By only enabling the environmental conditioning equipment when needed, longer life and/or less maintenance of the environmental conditioning equipment is enhanced, e.g., extending operating life of spaces heaters and/or heat tracing. Also if satisfactory environmental conditions within the enclosure cannot be maintained, then alarm indications thereof are made available to supervisory and maintenance personnel.

Monitoring within the enclosure may be determined using, for example, but not limited to: (1) a temperature sensor, (2) a relative humidity (RH) sensor, (3) a pressure sensor, (4) a liquid condensation detector(s) located at an interior surface (s) on which liquid condensation may form, (5) a liquid level detector(s) located at an interior location where liquids may collect, and/or (6) a combustible gas sensor. The liquid condensation sensor detects when condensing water vapor turns into a liquid and comes into contact with its surface. The liquid level sensor may be, for example, but is not limited to, a liquid level float sensor, an optical liquid level sensor, a liquid sensor adapted to detect capacitance change caused by liquid proximity thereto, or any other type of sensor whose characteristic(s) changes when a liquid comes into contact with its surface.

The combustible gas sensor may be used in the enclosure to determine whether a combustible gas(es) or vapor concentration poses a threat to the equipment inside of the enclosure. Combustible gas-air mixtures will burn over a wide range of concentrations. For each combustible gas or vapor, there is a specific minimum concentration, whereby when a concentration is above this amount, an ignition source will cause an explosion or flame front propagation. This minimum amount is called the Lower Explosive Limit (LEL) of that gas or vapor, and may also be referred to as the Lower Flammable Limit (LFL). The LEL/LFL is different for every gas. Some combustible gases are lighter than air, and some are heavier than air. Therefore, the combustible gas sensor(s) is (are) placed at the appropriate location(s) within the enclosure.

Control of the corrective actions to the environmental conditions within the enclosure may be, for example, but are not limited to: (1) a thermostat and/or humidistat controlling a space heater, dehumidification equipment, and/or a dry gas purge; (2) a digital processor, e.g., microcontroller, programmed to maintain a temperature, RH, pressure and/or predict a temperature and/or time at which water vapor condensation may occur, determine LEL/LFL alarm conditions for detected combustible gas or vapor concentrations; and/or (3) a remote computer control system capable of performing similar functions as the aforementioned digital processor. Water vapor condensation (dew point) temperature may be determined from a condensation table based upon RH measured by a RH sensor at a temperature measured by a temperature sensor(s). As the temperature drops, the RH increases until reaching 100 percent RH, then a further drop in temperature will cause some of the water vapor to condense into a liquid, e.g., dew point. Detection of gas concentrations approaching and/or about its LEL/LFL will generate an alarm and/or shut off any ignition source within the enclosure. The control device may be located within or external to the enclosure.

The control system, e.g., microcontroller and/or remote computer system, processes the signals from the sensors and determines whether any of the monitored parameters are outside of an acceptable range. In response to any parameter being outside an acceptable range, the control system sends an alarm signal to indicate a problem. The alarm signal may be sent to provide local indication, remote indication, or both. The alarm signal may be sent by wire, wireless, or a combination of both. Additionally, the control system may be programmed to activate or deactivate certain ones of the operational components to allow the parameter which is falling outside the acceptable range to return within the acceptable range. For example, a space heater or trace heater may be activated within the enclosure when a temperature is below a certain value, and/or RH is above a certain value. In another example, when the LEL/LFL of a combustible gas is exceeded, an ignition source within the enclosure can be shutdown. These corrective actions may be made automatically by the system or upon a user command sent from a local area or a remote location.

According to a specific example embodiment of this disclosure, a monitoring and control system for maintaining a desired environment inside of an enclosure having operational electrical components therein comprises: at least one operational electrical component; environmental conditioning equipment; environmental monitoring and control equipment coupled to and controlling the environmental conditioning equipment; at least one environmental sensor coupled to the environmental monitoring and control equipment; and an enclosure containing therein the at least one operational electrical component and the at least one environmental sensor; wherein the environmental monitoring and control equipment activates the environmental conditioning equipment when at least one environmental parameter is outside of a desired range, maintains activation of the environmental conditioning equipment until the at least one environmental parameter is in the desired range and then deactivates the environmental conditioning equipment thereafter; and wherein the environmental monitoring and control equipment determines a time period in which the control equipment is active and a rate of change of the at least one environmental parameter during the control equipment activation.

According to a specific example embodiment of this disclosure, a method for maintaining a desired environment inside of an enclosure having operational electrical components therein comprises the steps of: measuring a relative humidity within an enclosure; determining whether the measured relative humidity within the enclosure is greater than a desired relative humidity, wherein if the measured relative humidity is greater than the desired relative humidity then activating environmental conditioning equipment so as to reduce the measured relative humidity within the enclosure, if the measured relative humidity is not greater than the desired relative humidity then deactivating the environmental conditioning equipment if activated; determining a time period during which the environmental conditioning equipment is activated; determining a time rate of change for reducing the measured relative humidity; and returning to the step of measuring the relative humidity within the enclosure.

BRIEF DESCRIPTION OF THE DRAWINGS

For a more complete understanding of the present invention and the advantages thereof, reference is now made to the following description, in conjunction with the accompanying drawings briefly described as follows.

Figure 1:
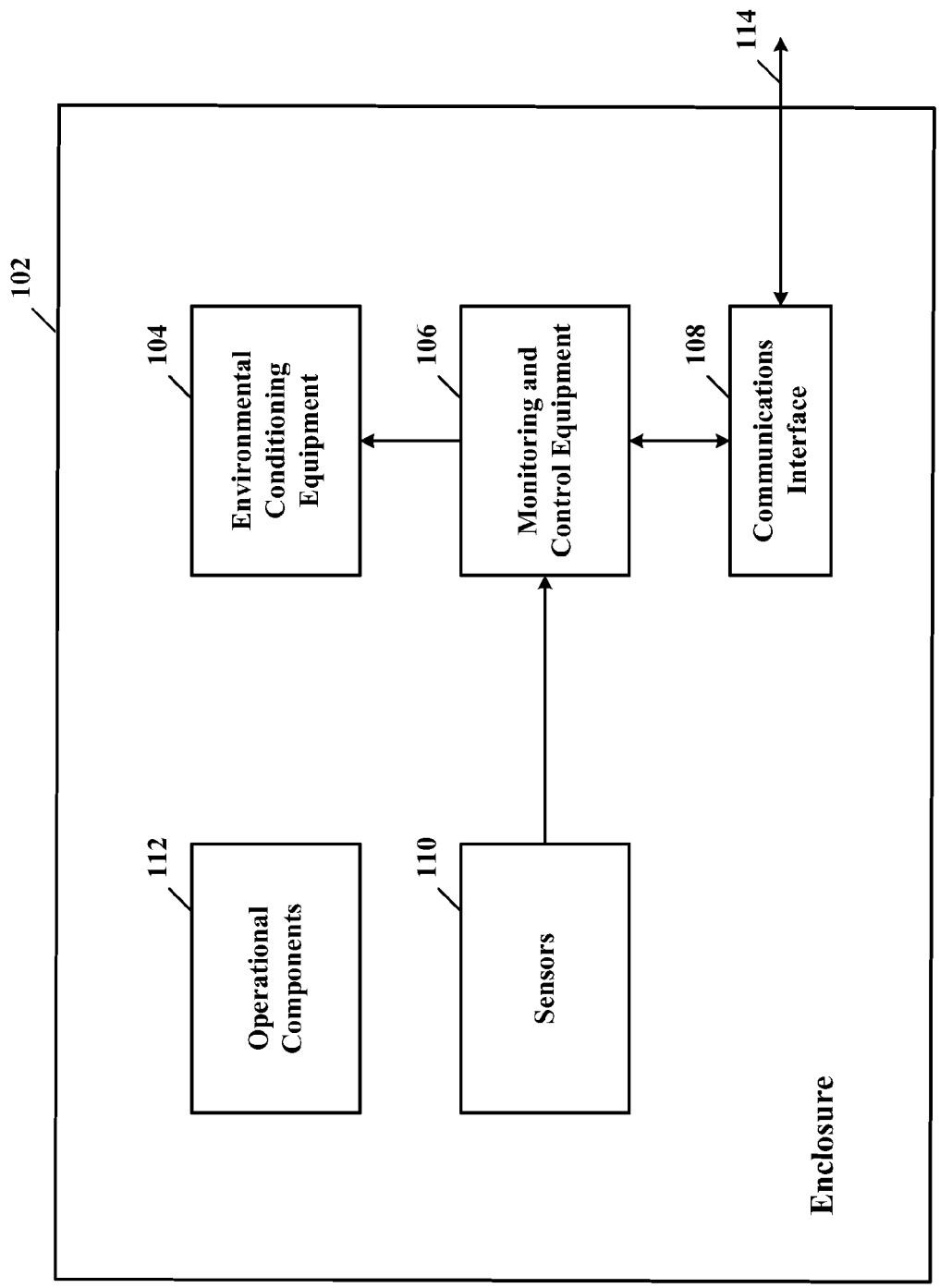
FIG. 1 illustrates a schematic block diagram of an enclosure having operational components, environmental conditioning equipment, environmental monitoring and control equipment, environmental sensors, and a communications interface located therein, according to specific example embodiments of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, details of example embodiments of the present invention are schematically illustrated. Like elements in the drawings will be represented by like numbers, and similar elements will be represented by like numbers with a different lower case letter suffix.

Referring to FIG. 1, depicted is a schematic block diagram of an enclosure having operational components, environmental conditioning equipment, environmental monitoring and control equipment, environmental sensors, and a communications interface located therein, according to a specific example embodiment of this disclosure. An enclosure 102 contains operational components 112, environmental conditioning equipment 104, monitoring and control equipment 106, sensors 110, and optionally a communications interface 108 coupled to an information transmission medium 114.

The enclosure 102 may be, for example, but is not limited to, explosion proof and non-explosion proof, indoor or outdoor, rain tight, dust tight, metal or non-metal NEMA enclosures, and equivalent international enclosures such as IEC standard enclosures. The operational components 112 may be, for example, but are not limited to, circuit breakers, fuses, motor starters, generator control equipment, programmable logic controllers (PLC), industrial process controllers, radio communications relays and repeaters. The operational components 112 may be any electrical/electronic components or equipment that could be damaged if condensing water vapor should be allowed to occur on its surface or internal parts.

The environmental conditioning equipment 104 may be, for example, but is not limited to, an electric space heater, a dehumidification/air conditioning system, dry nitrogen gas storage tank and electric control values for periodically purging the enclosure 102 of moisture vapor, for example. The monitoring and control equipment 106 may be, for example, but is not limited to, a thermostat or humidistat having relative humidity (RH) and temperature sensor inputs and outputs to control the environmental conditioning equipment 104; a digital processor based monitoring and control system based upon a microcontroller and environmental control program, data acquisition and control interface such as the input and output modules of a PLC in remote communications with a plant supervisory control and data acquisition (SCADA) system.

The sensors 110 may be used to measure, for example, but not limited to, temperature, pressure, combustible gas concentration, relative humidity (RH), and condensing water vapor. Condensing water vapor may be determined with a liquid level float sensor(s) positioned in locations within the enclosure 102 where liquids may collect, an optical liquid level sensor, and/or a sensor whose characteristics change when condensing water vapor turns to a liquid and comes into contact with its surface, e.g., change in resistance value when wet. Status sensor(s) may also be provided to monitor the operating condition of the environmental conditioning equipment 104. For example, a current sensor can monitor operation of the electric resistance space heater. Pressure, temperature and air flow sensors can monitor operation of the dehumidification/air conditioning system, and a pressure sensor can monitor the pressure charge of a dry nitrogen gas cylinder. This allows diagnostics to be performed on the environmental conditioning equipment 104 in conjunction with the environmental status inside of the enclosure 102.

The optional communications interface 108 may be, for example, but is not limited to, a data concentrator having inputs and outputs adapted to interface with the monitoring and control equipment 106, and an interface for a wired or wireless information transmission medium 114, e.g., Ethernet, fiber optic cable, 802.11 WiFi, Zigbee, spread spectrum, cell phone, microwave, UHF telemetry, etc. The communications interface 108 may also be an integral part of the monitoring and control equipment 106.

Figure 2:
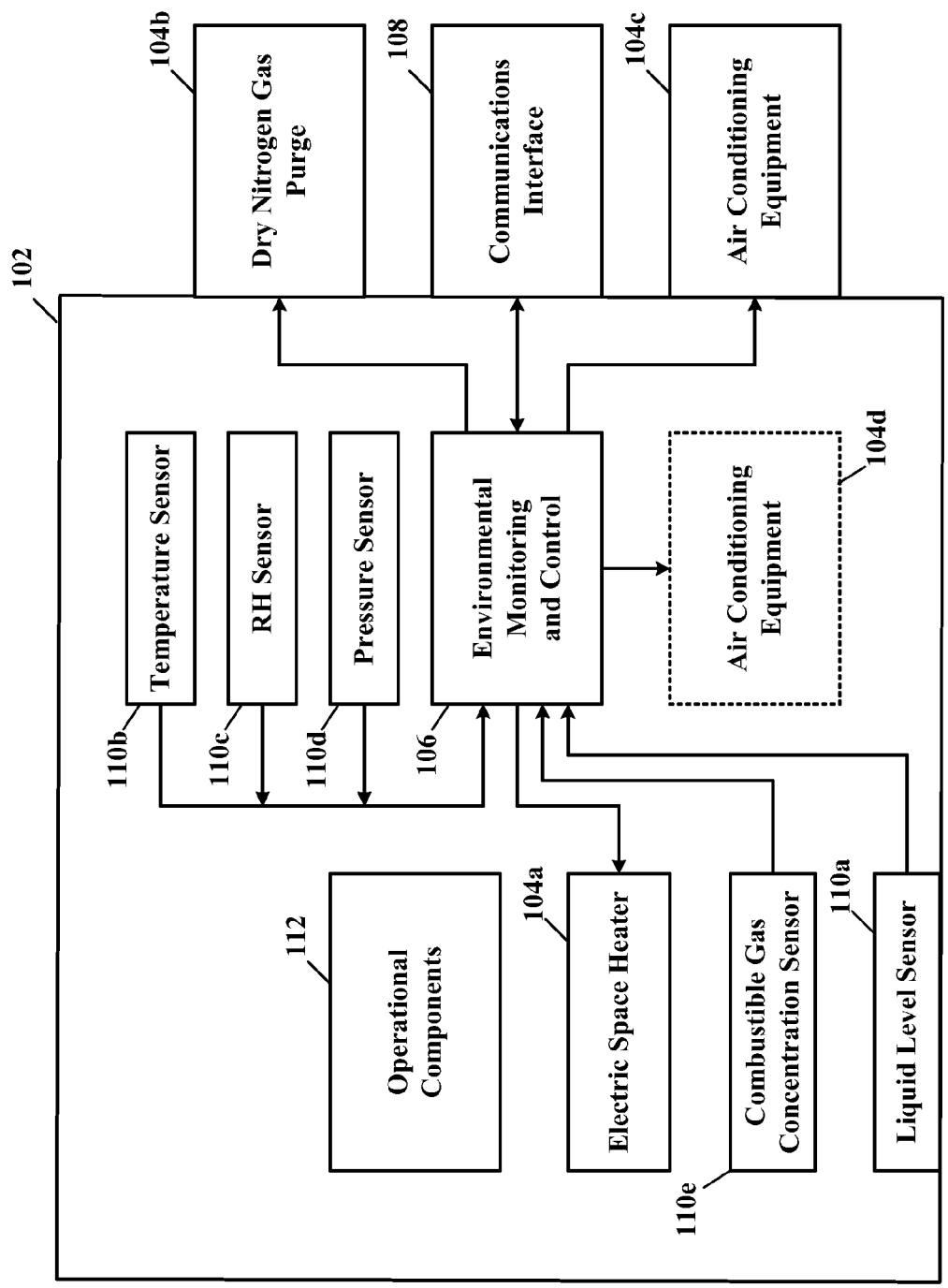
FIG. 2 illustrates a schematic elevational diagram of the various operational components, environmental conditioning equipment, environmental monitoring and control equipment, environmental sensors, and a communications interface located inside of or in close proximity to the enclosure, according to the specific example embodiments of this disclosure.

Referring to FIG. 2, depicted is a schematic elevational diagram of the various operational components, environmental conditioning equipment, environmental monitoring and control equipment, environmental sensors, and a communications interface located inside of or in close proximity to the enclosure, according to the specific example embodiments of this disclosure. The operational components 112 are located inside of the enclosure 102 along with the sensors 110a-110e and electric space heater 104a. A dry nitrogen gas purge system 104b and/or air conditioning (moisture control) equipment 104c may be located outside of the enclosure 102. Alternately, air conditioning equipment 104d may be located inside the enclosure 102. The liquid level sensor 110a is located anywhere within the enclosure 102 where liquids may collect when water vapor condenses on an inside surface(s) of the enclosure 102. The communications interface 108 may be a wired device communicating with a control room monitoring system, a wireless communications system in contact with a remote monitoring system (one-way or two-way communications), and/or indicator lights and other alarm devices, e.g., horns, bells, siren, etc. The pressure sensor 110d may be used in combination with the environmental monitoring and control equipment 106 and the dry nitrogen gas purge system 104b for maintaining a positive pressure and/or dilution of the high humidity air with the dry nitrogen gas in the enclosure 102. The combustible gas concentration sensor 110e may be used in combination with the environmental monitoring and control equipment 106 to alarm on and/or prevent combustion of a gas concentration above the LEL/LFL of that gas.

Figure 3:
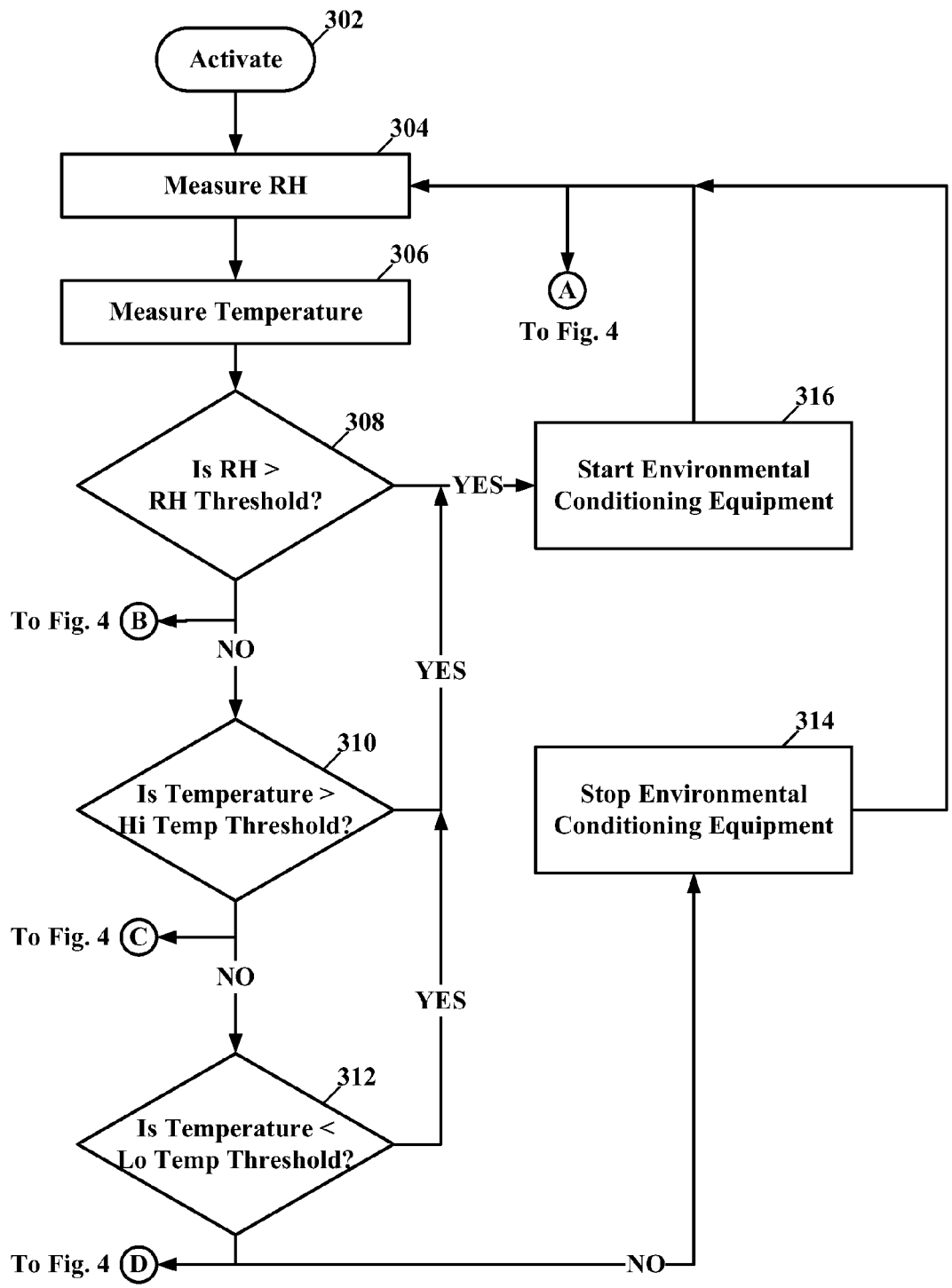
FIG. 3 illustrates a schematic operational process flow diagram for environmental control of the interior of the enclosure, according to the specific example embodiments of this disclosure.

Referring to FIG. 3, depicted is a schematic operational process flow diagram for environmental control of the interior of the enclosure, according to a specific example embodiment of this disclosure. In step 302 the monitoring and control equipment 106 is activated. In step 304 the interior relative humidity (RH) of the enclosure 102 is measured with the RH sensor 110d. In step 306 the interior temperature of the enclosure 102 is measured with the temperature sensor 110b.

In step 308 the environmental monitoring and control equipment 106 determines whether the interior RH is greater than a RH threshold value. If so, then in step 316 the environmental conditioning portion of the equipment 104 is started so as to reduce the internal RH of the enclosure 102. In step 310 the environmental monitoring and control equipment 106 determines whether the interior temperature is greater than a high temperature threshold value. If so, then in step 316 the environmental conditioning portion of the equipment 104 is started so as to reduce the internal temperature of the enclosure 102. In step 312 the environmental monitoring and control equipment 106 determines whether the interior temperature is less than a low temperature threshold value. If so, then in step 316 the environmental conditioning portion of the equipment 104 is started so as to increase the internal temperature of the enclosure 102. A simple electric space heater 104a may be used for interior RH reduction and/or warming from a low internal enclosure temperature. Air-conditioning or forced cold air equipment 104d may be used to reduce the internal temperature of the enclosure 102. When the RH and temperature within the enclosure 102 are within acceptable ranges, step 314 will stop the environmental conditioning equipment 104, thereby saving power.

Figure 4:
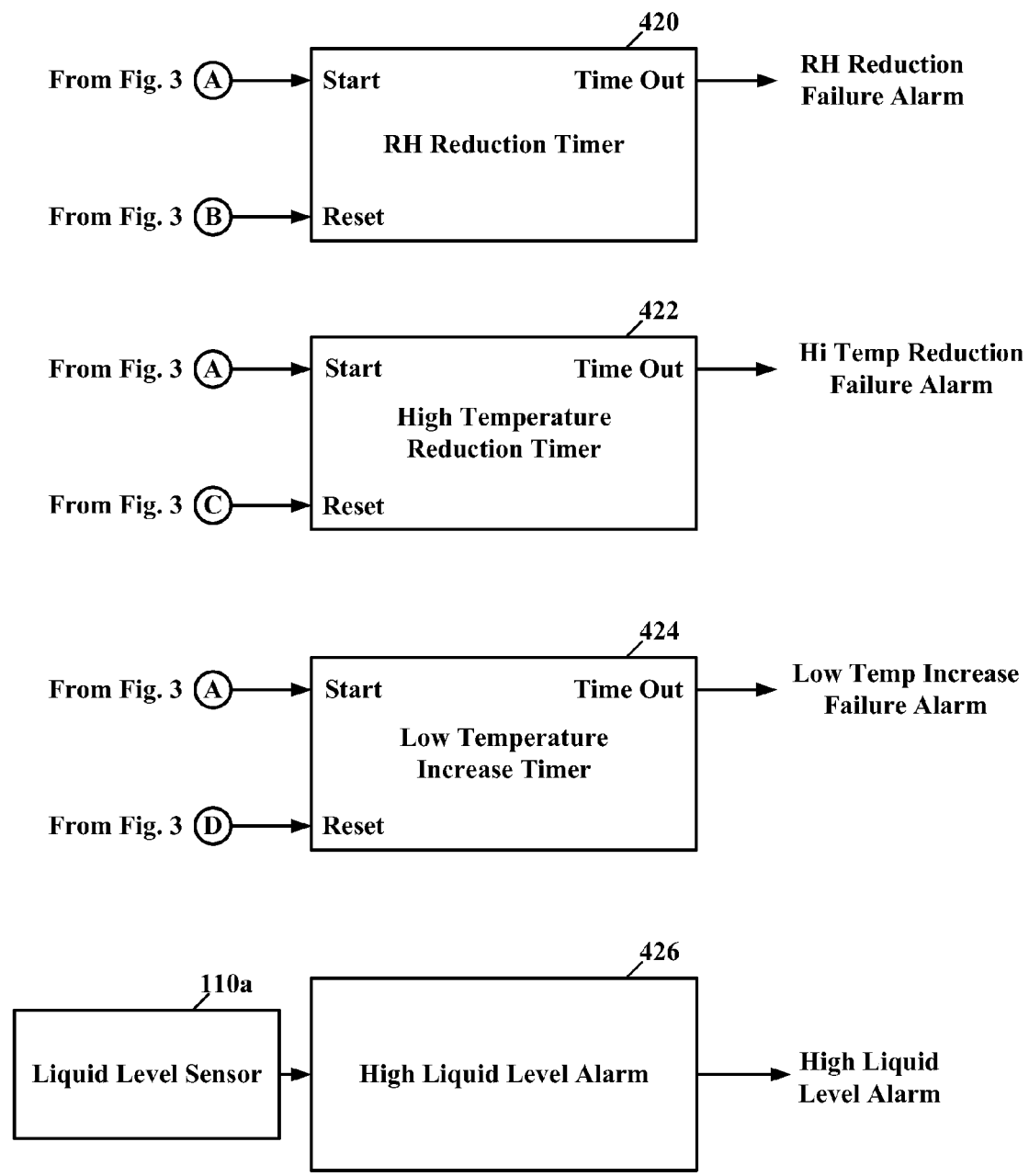
FIG. 4 illustrates a schematic process flow diagram for alarms generated from the operational process shown in FIG. 3, according to the specific example embodiments of this disclosure.

Referring to FIG. 4, depicted is a schematic process flow diagram for alarms generated from the operational process shown in FIG. 3, according to the specific example embodiments of this disclosure. In step 420 a RH reduction timer starts whenever the environmental conditioning equipment 104 is running, and stops when the RH is determined in step 308 to be below the RH threshold. The RH reduction timer of step 420 is programmed to have a certain time limit, and if that RH reduction time limit is exceeded then a RH reduction failure alarm is generated. The RH reduction failure alarm indicates that the interior RH of the enclosure 102 has not been reduced to a desired RH value within an expected time interval. This RH reduction failure alarm may indicate that the environmental conditioning equipment 104, e.g., air conditioner/dehumidifier 104d, has malfunctioned in some way and may require corrective maintenance.

In step 422 a high temperature reduction timer starts whenever the environmental conditioning equipment 104 is running, and stops when the interior temperature is determined in step 310 to below the high temperature threshold. The high temperature reduction timer of step 422 is programmed to have a certain time limit, and if that time limit is exceeded then a high temperature reduction failure alarm is generated. The high temperature reduction failure alarm indicates that the interior temperature of the enclosure 102 has not been reduced to a desired temperature value within an expected time interval. This high temperature reduction failure alarm may indicate that the environmental conditioning equipment 104, e.g., electric space heater 104a, air conditioner/dehumidifier 104d, has malfunctioned in some way and may require corrective maintenance.

In step 424 a low temperature increase timer starts whenever the environmental conditioning equipment 104 is running, and stops when the interior temperature is determined in step 312 to above the low temperature threshold. The low temperature increase timer of step 424 is programmed to have a certain time limit, and if that time limit is exceeded then a low temperature increase failure alarm is generated. The low temperature increase failure alarm indicates that the interior temperature of the enclosure 102 has not been increased to a desired temperature value within an expected time interval. This low temperature increase failure alarm may indicate that the environmental conditioning equipment 104, e.g., electric space heater 104a, has malfunctioned in some way and may require corrective maintenance. In step 426 a high liquid level alarm is generated when the liquid level sensor 110a detects a high liquid level condition in the enclosure 102.

Figure 5:
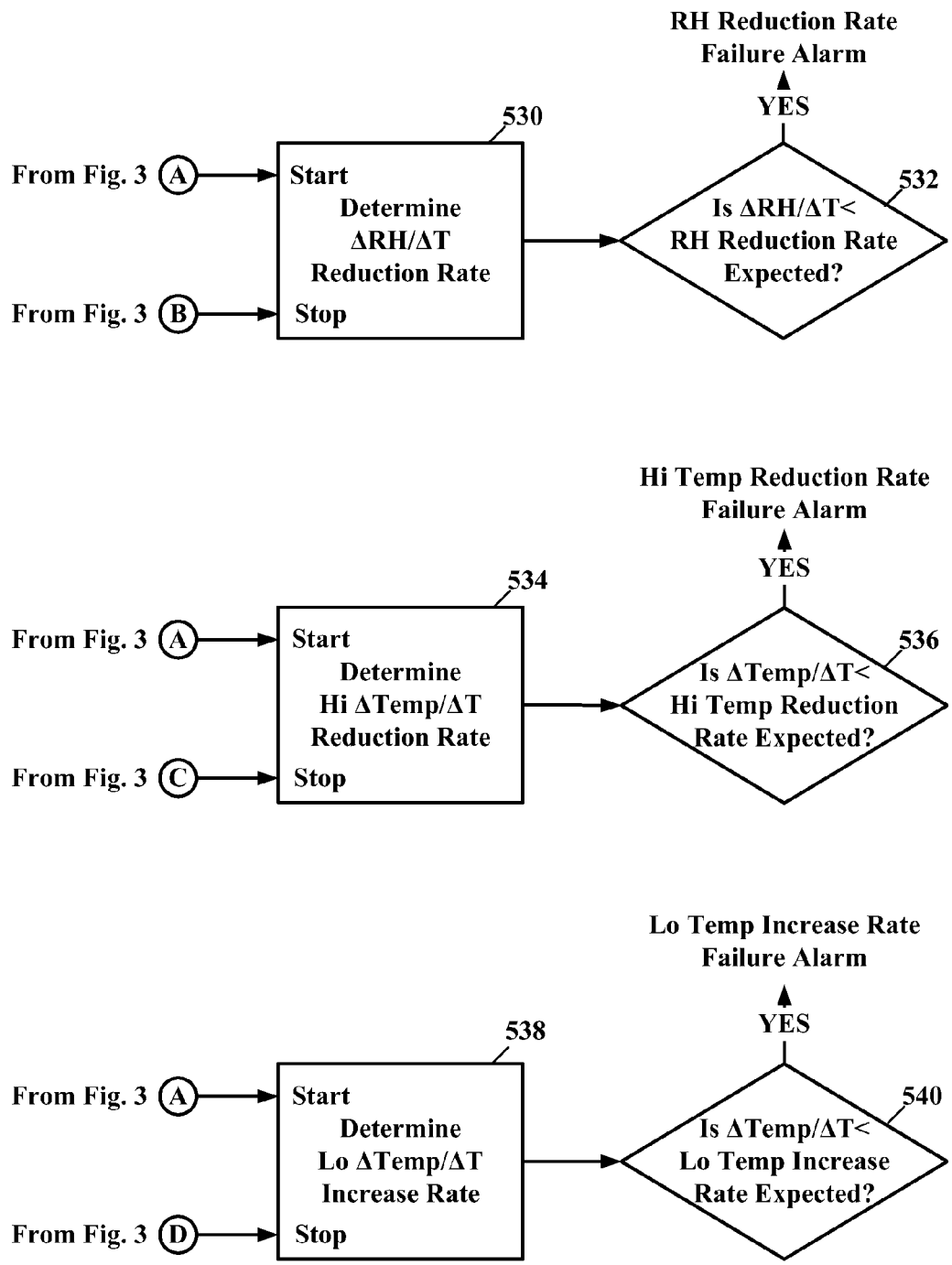
FIG. 5 illustrates a schematic process flow diagram for additional alarms generated from the operational process shown in FIG. 3, according to the specific example embodiments of this disclosure.

Referring to FIG. 5, depicted is a schematic process flow diagram for additional alarms generated from the operational process shown in FIG. 3, according to the specific example embodiments of this disclosure. In step 530 a RH reduction rate is determined whenever the environmental conditioning equipment 104 is running. The actual RH reduction rate determined in step 530 is then compared in step 532 with an expected RH reduction rate. If the actual RH reduction rate determined in step 530 is less than the expected RH reduction rate, then a RH reduction rate failure alarm is generated. The RH reduction rate failure alarm indicates that the interior RH of the enclosure 102 has not been reduced as fast as it should be, thus the RH reduction failure alarm may indicate that the environmental conditioning equipment 104, e.g., air conditioner/dehumidifier 104d, is not operating most efficiently and/or has malfunctioned in some way, thereby requiring corrective maintenance.

In step 534 a high temperature reduction rate is determined whenever the environmental conditioning equipment 104 is running. The actual high temperature reduction rate determined in step 534 is then compared in step 536 with an expected high temperature reduction rate. If the actual high temperature reduction rate determined in step 534 is less than the expected high temperature reduction rate, then a high temperature reduction rate failure alarm is generated. The high temperature reduction rate failure alarm indicates that the interior temperature of the enclosure 102 is not been reduced as fast as it should be, thus the high temperature reduction failure alarm may indicate that the environmental conditioning equipment 104, e.g., air conditioner/dehumidifier 104d, is not operating most efficiently and/or has malfunctioned in some way, thereby requiring corrective maintenance.

In step 538 a low temperature increase rate is determined whenever the environmental conditioning equipment 104 is running. The actual low temperature increase rate determined in step 538 is then compared in step 540 with an expected low temperature increase rate. If the actual low temperature increase rate determined in step 538 is less than the expected low temperature increase rate, then a low temperature increase rate failure alarm is generated. The low temperature increase rate failure alarm indicates that the interior temperature of the enclosure 102 has not been increased as fast as it should be, thus the low temperature increase failure alarm may indicate that the environmental conditioning equipment 104, e.g., electric space heater 104a, is not operating efficiently and/or has malfunctioned in some way, thereby requiring corrective maintenance.

Figure 6:
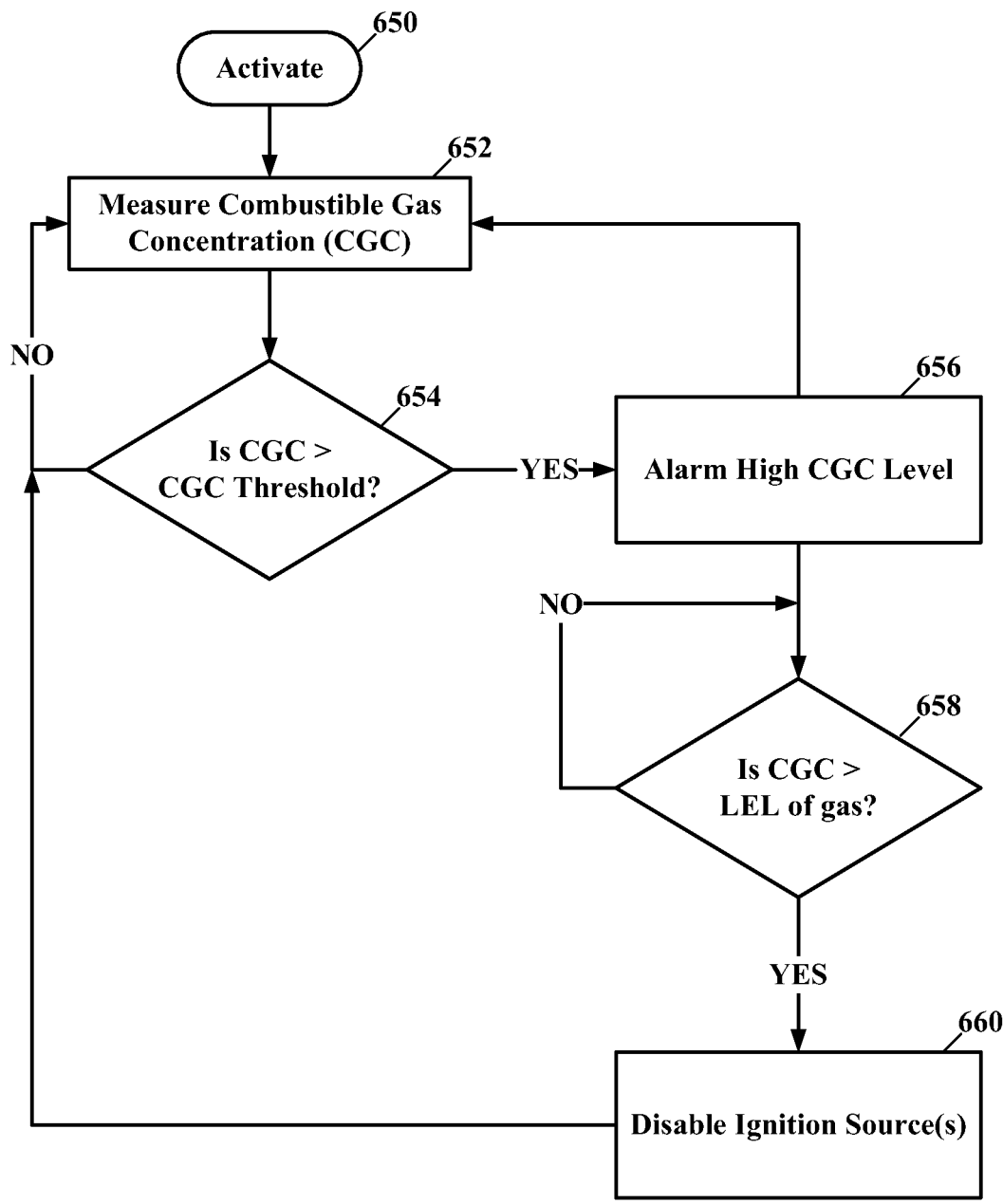
FIG. 6 illustrates a schematic operational process flow diagram for combustible gas detection, alarm and shutdown of ignition sources within the interior of the enclosure, according to another specific example embodiment of this disclosure.

Referring to FIG. 6, depicted is a schematic operational process flow diagram for combustible gas detection, alarm and shutdown of ignition sources within the interior of the enclosure, according to another specific example embodiment of this disclosure. In step 650 the monitoring and control equipment having combustible gas concentration (CGC) detection capabilities are activated. In step 652 the combustible gas concentration level within the enclosure 102 is measured with the CGC sensor 110e.

In step 654 the environmental monitoring and control equipment 106 determines whether the CGC is greater than a CGC threshold value. If so, then in step 656 a high CGC alarm is generated. In step 658 the environmental monitoring and control equipment 106 determines whether the CGC within the enclosure 102 is greater than a Lower Explosive Limit (LEL) or Lower Flammable Limit (LFL) for the type of gas or vapor comprising the CGC. If so, then in step 660 any ignition source in the enclosure 102 is disabled (e.g., shutdown, turned off, disconnected, etc.).

It is contemplated and within the scope of this disclosure that time measurements, calculation of RH and temperature change rates and comparisons to stored expected change rates, storage of expected environmental correction times, control of the environmental conditioning equipment 104, monitoring of the sensors may be performed by a computer system such as a microcontroller based system and may be part of the environmental monitoring and control equipment 106 and/or a remote computer system coupled to the communications interface 108.

In addition, the sensors 110, environmental monitoring and control equipment 106 and communications interface 108 may be packaged as a single integrated system that may be easily and expensively placed within the enclosure 102 and perform the functions as described hereinabove.

Although specific example embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

I claim:

1. A monitoring and control system, said system comprising:
    at least one operational electrical component;
    environmental conditioning equipment;
    environmental monitoring and control equipment coupled to and controlling the environmental conditioning equipment;
    at least one environmental sensor coupled to the environmental monitoring and control equipment; and
    an electrical enclosure containing therein the at least one operational electrical component and the at least one environmental sensor, wherein the electrical enclosure complies with the National Electrical Manufacturers Association standards for electrical enclosures,
    wherein the at least one environmental sensor measures at least one environmental parameter within the electrical enclosure,
    wherein the environmental monitoring and control equipment activates the environmental conditioning equipment when the at least one environmental parameter within the electrical enclosure measured by the at least one environmental sensor is outside of a desired range, maintains activation of the environmental conditioning equipment until the at least one environmental parameter within the electrical enclosure as measured by the at least one environmental sensor is in the desired range, and subsequently deactivates the environmental conditioning equipment; and
    wherein the environmental monitoring and control equipment determines a time period in which the environmental monitoring and control equipment is active and a rate of change of the at least one environmental parameter during activation of the environmental monitoring and control equipment.

2. The monitoring and control system according to claim 1, wherein the environmental conditioning equipment and the environmental monitoring and control equipment are contained in the electrical enclosure.

3. The monitoring and control system according to claim 1, wherein the environmental conditioning equipment is selected from the group consisting of an electric space heater, an air conditioning system, a dehumidification system, and a dry nitrogen gas purge system.

4. The monitoring and control system according to claim 1, wherein the environmental monitoring and control equipment is selected from the group consisting of a thermostat and a humidistat.

5. The monitoring and control system according to claim 1, wherein the environmental monitoring and control equipment comprises a microcontroller programmed to maintain the desired environment inside of the electrical enclosure by controlling the environmental conditioning equipment based upon environmental information from the at least one environmental sensor.

6. The monitoring and control system according to claim 1, wherein the at least one environmental sensor is selected from any one or more of the group consisting of a relative humidity sensor, a temperature sensor, a pressure sensor, and a combustible gas concentration sensor.

7. The monitoring and control system according to claim 1, wherein the at least one environmental parameter is selected from any one or more of the group consisting of relative humidity, temperature, pressure, and lower explosive limit (LEL) of a combustible gas.

8. The monitoring and control system according to claim 1, further comprising a communications interface coupled to the monitoring and control equipment and adapted for communicating information between the monitoring and control equipment and a remote supervisory and control system.

9. The monitoring and control system according to claim 8, wherein the information between the monitoring and control equipment and a remote supervisory and control system is communicated over a wired medium.

10. The monitoring and control system according to claim 8, wherein the information between the monitoring and control equipment and a remote supervisory and control system is communicated over a wireless medium.

11. The monitoring and control system according to claim 1, further comprising generating an alarm if the at least one environmental parameter is not brought within the desired range within a certain time period.

12. The monitoring and control system according to claim 1, further comprising generating an alarm if the at least one environmental parameter is not changing within a desired rate of change.

13. The monitoring and control system according to claim 1, further comprising deactivating the environmental conditioning equipment if the at least one environmental parameter is not brought within the desired range within a certain time period.

14. The monitoring and control system according to claim 1, further comprising deactivating the least one operational electrical component if a lower explosive limit (LEL) of a combustible gas concentration is exceeded.

15. The monitoring and control system according to claim 1, wherein the electrical enclosure is selected from the group consisting of, an explosion proof enclosure, a dust proof enclosure, a water proof enclosure, a rain tight enclosure, and an indoor dry use enclosure.

16. The monitoring and control system according to claim 1, further comprising a liquid level detector coupled to the environmental monitoring and control equipment, wherein if a high liquid level is determined by the liquid level detector then the environmental monitoring and control equipment will generate a high liquid level alarm.

17. The monitoring and control system according to claim 1, wherein the at least one operational electrical component is selected from any one or more of the group consisting of at least one circuit breaker, at least one fuse, at least one motor starter, generator control equipment, programmable logic controller (PLC), industrial process controller, radio communications relay and repeater.

18. A method for maintaining a desired environment inside of an electrical enclosure having at least one operational electrical component disposed therein, said method comprising the steps of:
    measuring at least one environmental parameter within the electrical enclosure, wherein the electrical enclosure complies with the National Electrical Manufacturers Association standards for electrical enclosures;
    determining whether the at least one environmental parameter that is measured within the electrical enclosure is greater than a threshold value, wherein
        if the at least one environmental parameter that is measured within the electrical enclosure is greater than the threshold value, then activating environmental conditioning equipment so as to reduce the at least one environmental parameter within the electrical enclosure,
        if the at least one environmental parameter that is measured within the electrical enclosure is not greater than the threshold value, then deactivating the environmental conditioning equipment;

determining a first time period during which the environmental conditioning equipment is activated;

determining a time rate of change for reducing the at least one environmental parameter that is measured within the electrical enclosure; and returning to the step of measuring the at least one environmental parameter that is within the electrical enclosure.

19. The method according to claim 18, further comprising the steps of:

measuring a temperature within the electrical enclosure;

determining whether the measured temperature within the electrical enclosure is greater than a desired temperature, wherein if the measured temperature is greater than the desired temperature then activating the environmental conditioning equipment so as to reduce the measured temperature within the electrical enclosure, if the measured temperature is not greater than the desired temperature then deactivating the environmental conditioning equipment if activated;

determining a second time period during which the environmental conditioning equipment is activated;

determining a time rate of change for reducing the measured temperature; and returning to the step of measuring the temperature within the electrical enclosure.

20. The method according to claim 18, further comprising the steps of:

measuring a temperature within the electrical enclosure;

determining whether the measured temperature within the electrical enclosure is less than a desired temperature, wherein if the measured temperature is less than the desired temperature then activating the environmental conditioning equipment so as to increase the measured temperature within the electrical enclosure, if the measured temperature is not less than the desired temperature then deactivating the environmental conditioning equipment if activated;

determining a second time period during which the environmental conditioning equipment is activated;

determining a time rate of change for increasing the measured temperature; and returning to the step of measuring the temperature within the electrical enclosure.

21. The method according to claim 18, further comprising the step of generating an alarm if the first time period during which the environmental conditioning equipment is reducing the environmental parameter is greater than a first expected time period.

22. The method according to claim 18, further comprising the step of generating an alarm if the time rate of change during which the environmental conditioning equipment is reducing the relative humidity is less than an expected humidity reduction time rate of change.

23. The method according to claim 19, further comprising the step of generating an alarm if the second time period during which the environmental conditioning equipment is reducing the temperature is greater than a second expected time period.

24. The method according to claim 19, further comprising the step of generating an alarm if the time rate of change during which the environmental conditioning equipment is reducing the temperature is less than an expected temperature reduction time rate of change.

25. The method according to claim 20, further comprising the step of generating an alarm if the second time period during which the environmental conditioning equipment is increasing the temperature is greater than a second expected time period.

26. The method according to claim 18, further comprising the steps of:

measuring a combustible gas concentration within the electrical enclosure;

determining whether the combustible gas concentration within the electrical enclosure is greater than a combustible gas concentration threshold, wherein if the combustible gas concentration is greater than the combustible gas concentration threshold then generating a high combustible gas concentration alarm.

27. The method according to claim 26, further comprising the step of: determining whether the combustible gas concentration within the electrical enclosure is greater than a lower explosive limit (LEL) of the combustible gas, wherein if the combustible gas concentration is greater than the LEL of the combustible gas then disabling operation of the operational electrical components in the electrical enclosure.

28. The method according to claim 18, wherein the at least one environmental parameter comprises relative humidity.

* * * * *